United States Patent [19]

Patterson

[11] 4,336,725
[45] Jun. 29, 1982

[54] APPARATUS FOR REPRODUCING CODED CONTOUR SHAPES IN SAW BLADES

[76] Inventor: Dennis O. Patterson, 11842 Victory Blvd. #11, North Hollywood, Calif. 91606

[21] Appl. No.: 146,070

[22] Filed: May 2, 1980

[51] Int. Cl.³ .............................. B26F 1/36; B26F 1/40
[52] U.S. Cl. ....................................... 76/25 R; 30/333
[58] Field of Search ......................... 76/25 R; 30/358; 83/463, 452, 453, 457, 458, 459, 460, 461, 462, 464, 465, 466

[56] References Cited

U.S. PATENT DOCUMENTS 3,416,397 12/1968 Preston .................................. 83/459

FOREIGN PATENT DOCUMENTS 1167916 10/1969 United Kingdom .................. 30/358

Primary Examiner—Roscoe V. Parker
Attorney, Agent, or Firm—Roger A. Marrs

[57] ABSTRACT

Apparatus is provided herein for accepting a severed end of a saw blade into a clamping and squaring mechanism over a contoured die set. The die set is located immediately below a plunger slidably mounted through a supporting bridge so that force imparted therethrough to the die set causes the contoured shape of the die to be formed in the severed saw blade. The bridge is secured to a base which supports a portion of the die set and a movement limit or stop device is incorporated into the plunger to limit the stroke of the plunger.

6 Claims, 10 Drawing Figures

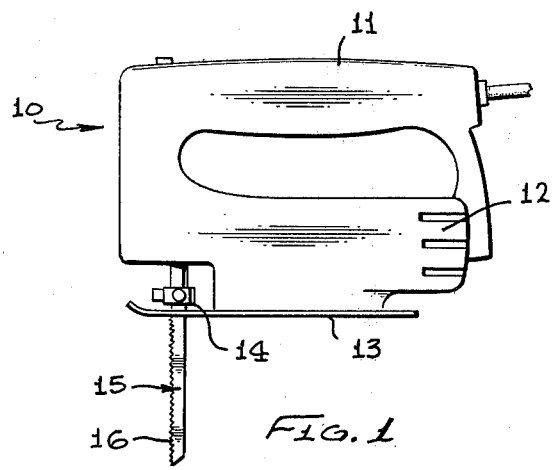
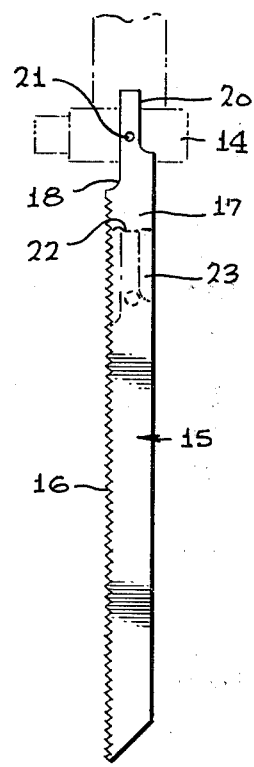
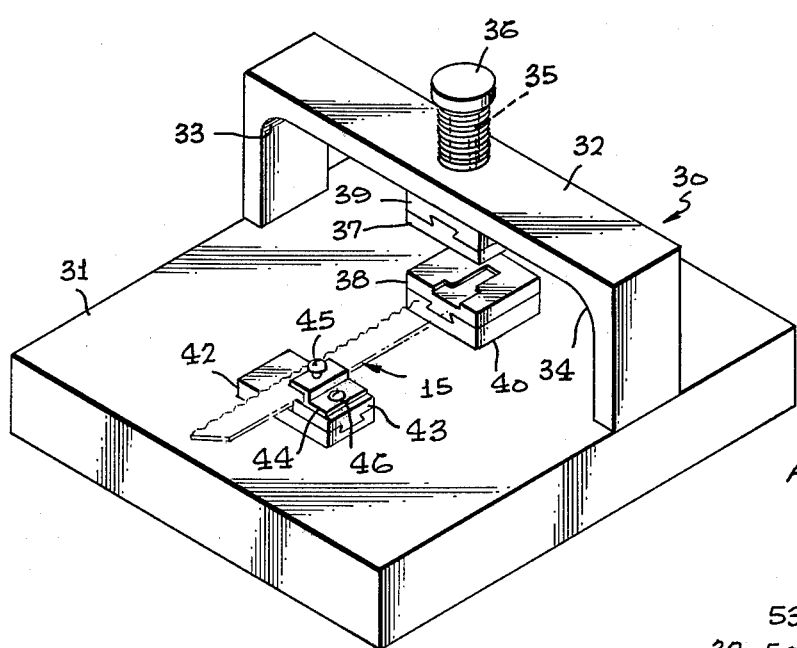
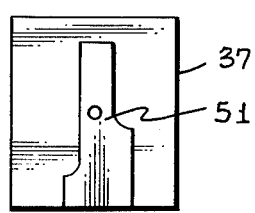
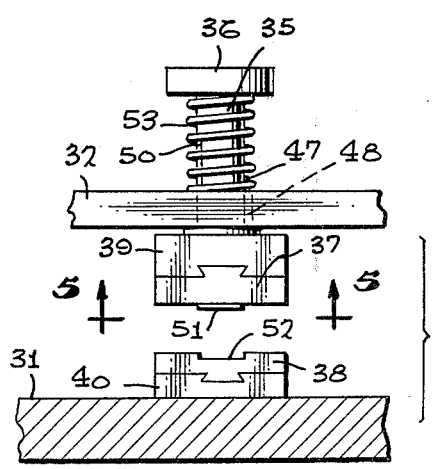

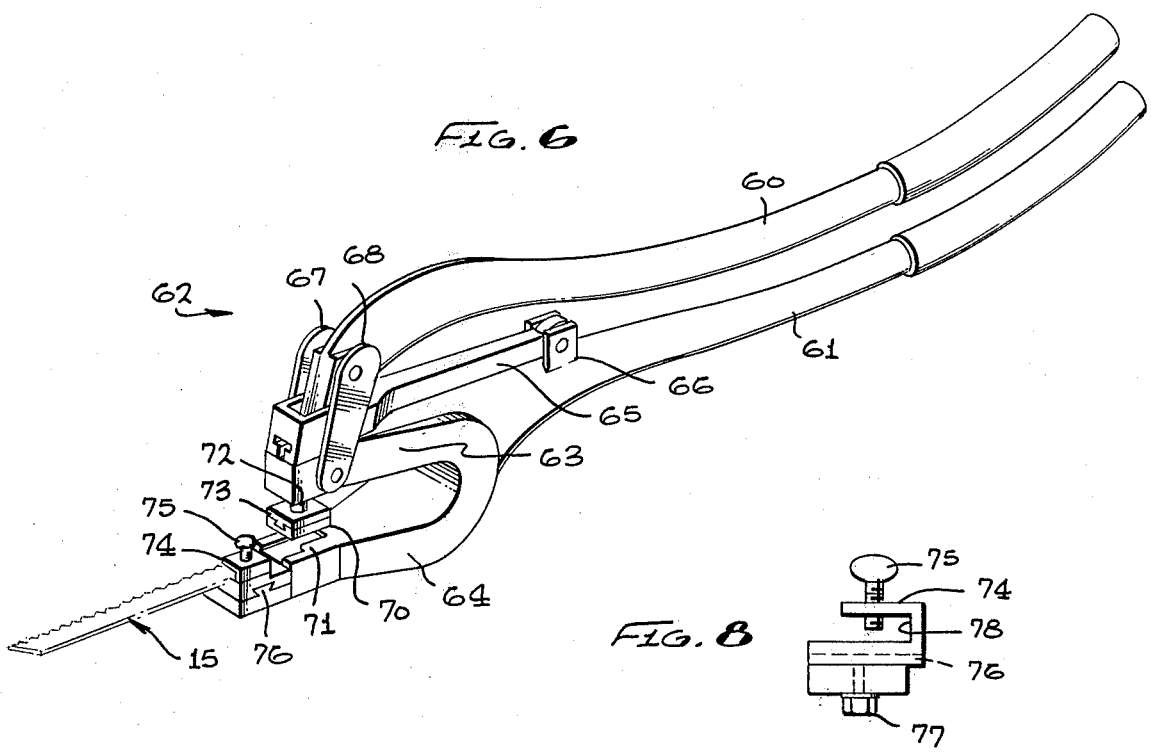
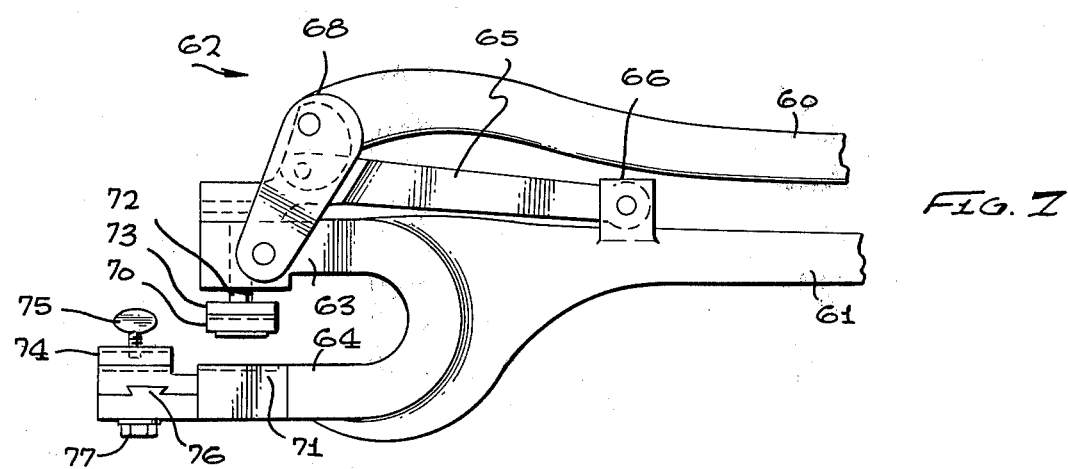
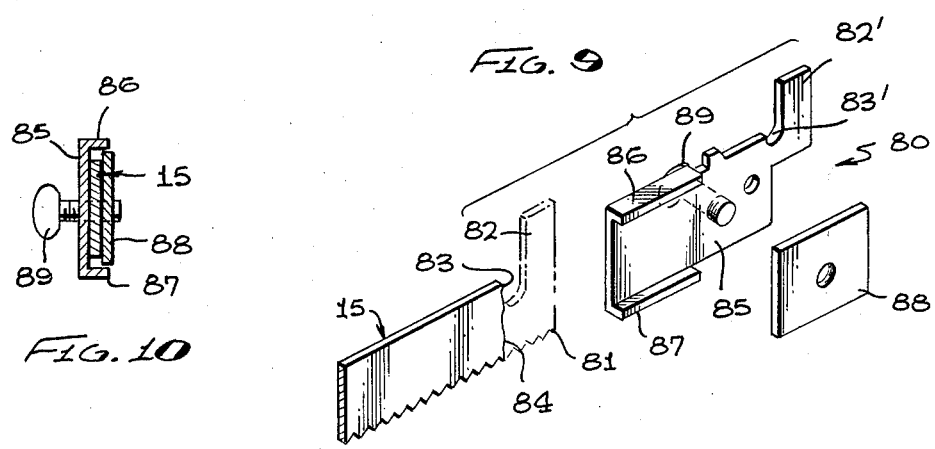

APPARATUS FOR REPRODUCING CODED CONTOUR SHAPES IN SAW BLADES

BACKGROUND OF THE INVENTION

1. Field of the Invention

The present invention relates to apparatus for recreating coded shapes or contours in the severed end of a saw blade and more particularly, to a novel apparatus adapted to reproduce the contoured shape regardless of the contour being within the width of over the width of the original saw blade.

2. Brief Description of the Prior Art

In present day construction work, electric equipment is used for a variety of purposes. For example, electric saws are used which employ detachable saw blades that are cantilevered from a holding chuck. However, difficulties and problems have been encountered with this type of electric saw which stem largely from the fact that excessive vibration occurs resulting in breaking of the saw blade in close proximity to the chuck.

The severed saw blade is unsuitable for reuse because the original blade includes a contoured or coded end which is received into a corresponding contour or key in the saw chuck. In this manner, only a particular saw blade manufactured by a given manufacturer will be usable in the saw and saw chuck of that manufacturer. Consequently, thousands of dollars worth of usable saw blades are discarded after the blade has been broken or severed as previously described. No means are available for reshaping or contouring the broken part of the saw blade so that it may again be reused.

Therefore, a long standing need has existed to provide a novel apparatus for contouring or shaping a keyed or coded end of a severed saw blade so that it will be readily received into a mating chuck for reuse.

SUMMARY OF THE INVENTION

Accordingly, the above problems and difficulties are obviated by the present invention which provides a novel apparatus for recontouring or reshaping a selected end of a severed saw blade so that it will be readily accepted into a mating chuck of an electric saw. In one form, the apparatus comprises a base supporting a bridge in which an impact plunger is slidably mounted. A die set is located immediately beneath the impact plunger and receives the selected end of the severed saw blade intended to be shaped or contoured. The latter mentioned end is disposed between the male and female die of a die set wherein one of the members of the die set is movably carried on the plunger while the opposite member of the die set is supported on the base. Means are provided for clamping the severed saw blade into position and for squaring the blade with respect to the die carried by the die set.

Resilient means are operably disposed between the bridge and an impact head carried on the impact plunger so that the plunger is normally raised to open a cavity or space between the die set members. Stop limit means are provided for limiting the movement or distance of travel of the plunger when an impact force is applied to the impact head thereof.

In another form of the invention, a pliers or hand lever mechanism is provided which includes the die set members being disposed between the jaws of the pliers whereby the severed saw blade is introduced between the members thereof so that upon compression of the handles associated with the die set members effects forming of the code or shape in the end of the severed blade. A similar clamping and squaring means to that applied to the press immediately described is included with respect to the embodiment covering the pliers or lever mechanism.

The aforementioned apparatus is usable when the intended key or coded shape is to be applied to the saw blade within the width of the saw blade. In instances where a particular code or index is required that is in excess of the blade width, an adapter is envisioned which includes a clamping means for holding the severed saw blade in place with respect to a portion of the adapter having a suitable coded or keyed index suitable for being received into a chuck having a corresponding code greater than the width of the saw blade.

Therefore, it is among the primary objects of the present invention to provide a novel apparatus for reproducing coded contour shapes in saw blades so that severed saw blades may be reused in electric saws having chucks provided with corresponding codes or index shapes.

Another object of the present invention is to provide a novel apparatus for reconditioning and reshaping severed saw blades so that they may be readily used again in specialized electric power saws.

Still a further object of the present invention is to provide an economic apparatus for reconditioning used saw blades so that they may be reused in a variety of electric saws having different coded or contoured chucks from the contour or code of the original blade.

Still a further object of the present invention is to provide a novel means for adapting a severed saw blade for reuse when its coded portion originally included a code having a member greater than the width of the saw which includes an adapter having clamping means and a coded portion adapted to be so received.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of a typical electric saw having a saw blade mounted on the chuck thereof;

FIG. 2 is an enlarged side elevational view of a typical saw blade having a portion shaped or contoured to be received in the chuck of the electric saw;

FIG. 3 is a perspective view of a novel press for incorporating a code or index shape into the severed end of a saw blade;

FIG. 4 is a fragmentary view, partly in cross-section, illustrating the impact plunger and the die set members employed in the press apparatus shown in FIG. 3;

FIG. 5 is a plan view of a die set member shown in FIG. 4 as taken in the direction of arrows 5—5 thereof;

FIG. 6 is a perspective view showing another embodiment of the present invention in the form of a pliers incorporating die set members between the jaws thereof;

FIG. 7 is an enlarged side elevational view of the pliers shown in FIG. 6 including the clamping and squaring means as well as the die set members or stamping or shaping the severed saw blade;

FIG. 8 is a front elevational view of the clamping and squaring means used in the embodiment of FIGS. 6 and 7;

FIG. 9 is a perspective view of another embodiment of the present invention illustrating an adapter for receiving the severed saw blade; and FIG. 10 is a front elevational view of the adapter shown in FIG. 9.

DESCRIPTION OF PREFERRED EMBODIMENT

Referring to FIG. 1, a typical or conventional electric saw is indicated by numeral 10 which includes a handle portion 11 and a motor portion 12. A guide or runner is indicated by numeral 13 and a chuck 14 is employed for releasably holding a conventional saw blade 15. The chuck 14 is provided with a pair of set screws for detachably clamping with one end of the saw blade 15. When power is applied, the saw blade moves back and forth rapidly to create the cutting action for the row of teeth 16 carried along one edge of the blade 15. However, during the operation of the device, vibrations are created in the saw blade during the cutting procedure, particularly when iron, steel or the like is being sawed, so that the blade breaks in an area substantially close to the guide 13 or chuck 14.

As shown in FIG. 2, the saw blade 15 includes a selected end identified by numeral 17 which includes a particular cut-out or apertured arrangement constituting a code. This coded end is then inserted into the chuck 14 where it is matched in registry with components intended to hold the saw blade in position. In the present instance, the coded portion 17 is within the blade width and includes an elongated cut-out 18 and a somewhat shorter cut-out 20. A hole 21 is provided in the blade and forms a part of the code intended to be registered with parts of the chuck 14.

As previously described, during a cutting procedure, should the saw teeth 16 engage with metal such as a nail or a conduit, vibrations occur in the blade which cause the blade to sever at the line indicated by numeral 22. Under normal practice, the main portin of the blade is then thrown away since it can not be reused as the end of the blade 15 will not be received into the coded chuck 14. As is the purpose of the present invention, the coded end 17 is recreated in the blade portion 23 and is illustrated in broken lines. The broken line configuration is identical to the configuration of portion 17 which includes the cut-outs 18 and 20 as well as the hole 21. Once the severed blade has been provided with the proper code or contour, the blade can be reused.

Referring now to FIG. 3, an apparatus is illustrated for shaping or contouring the severed blade 15 so as to include the contour or shape necessary to be received into a mating chuck. The blade 15 is inserted into the device so that the end adjacent to the sever line 22 represents the selected end to be formed. The device or apparatus takes the form of a press indicated in the general direction of arrow 30 which includes a base 31 having a yoke or bridge 32 supported thereon. Since the bridge is intended to receive or translate impact force to the base 31, it is preferred that the legs of the yoke 32 be joined to the cross piece by rounded portions such as indicated by numerals 33 and 34 respectively. Midway between the opposite ends of the cross bar of the yoke 32, there is provided a plunger 35 having an impact head 36 intended to receive sharp blows or impacts thereto. Underneath the plunger 35, a die set is provided having die members 37 and 38 removably carried on a support 39 carried on the end of plunger 35 and a block 40 carried on the base 31 respectively. The die members 37 and 38 represent male and female components and include a die configuration intended to produce the special shape on the end of the severed saw blade intended to be received into the chuck 14. As is shown, the outline of the die associated with member 38 is suitable for forming the configuration shown in FIG. 2. The corresponding shape for the die 37 is illustrated in FIG. 5 by the numeral 41.

In order to align the blade properly with respect to the die and to hold the severed blade in position, a clamping and squaring means is provided taking the form of a support block 42 on which is reslidably mounted, a squaring block 43 and a clamp 44. A thumb screw 45 may be rotated to bear against the flat face or surface of the blade 15 to hold it in position against the block 42 and against the flat squaring surface of the squaring block 43. For different width blades, a set screw 46 may be readily loosened so that the squaring block may be slid laterally with respect to the longitudinal access of the blade. When the proper width has been selected, the set screw may be tightened.

It is also to be noted that the die members 37 and 38 of the die set include dove tails which permit interchangeability of dies should other shapes be placed into the end 23 of the severed blade 15.

Referring now in detail to FIG. 4, it can be seen that the plunger 35 further includes a key 47 slidable in slot 48 carried in the yoke of the bridge 32. This construction keeps the plunger from rotating with respect to the bridge as the plunger moves up and down through the yoke. Also, it is to be noted that the travel of the plunger downward is limited by engagement of the shoulder 50 with the edge of the yoke of bridge 32 when the plunger is in the down position. This stop insures that the die members will not over travel with respect to one another. As illustrated, member 37 of the die set includes a male die 51 while the member 38 of the die set includes a female configuration identified by numeral 52. A resilient means such as a compression spring 53 is operably disposed between the underside of the impact head 36 and the top side of the yoke of bridge 32 so that the plunger 35 is normally biased in a raised position so as to separate the die set members 37 and 38 respectively.

In actual operation, the saw blade 15 is disposed with respect to the die set so that the end 23 intended to be shaped is introduced between the die members 37 and 38 respectively. The straight edge of the saw blade 15 is squared against block 43 and the clamping means including thumb screw 45 is actuated to tighten blade in position. Next, an impact device such as a hammer or the like is brought to bear against the impact head 36 so that the plunger slides through the yoke of bridge 32 and causes the member 37 of the die set to engage with the blade and forcibly cut the material into the shape desired. In the present instance, the shape is the form of the die as shown in general by the numeral 41 in FIG. 5. Excess material can be received into the female portion of the die carried on member 38. Once the cutting or shaping procedure has been achieved, the spring 53 urges the plunger upwardly to separate the die members so that the shaped blade 15 can be removed. After removal the blade is in condition for reuse in a suitable chuck.

Referring to FIG. 6, another embodiment of the present invention is illustrated which takes the form of a pliers-type press or punch wherein the user grips a pair of handles 60 and 61 in order to actuate the device which is indicated in the general direction of arrow 62. Handle lever 61 is formed with a U-shaped pair of jaws indicated by numerals 63 and 64 respectively. These jaws are in fixed space relationship with respect to one another and jaws 63 serves to mount the handle lever 60 via a pivot linkage 65 pivoted at one end at bracket 66. A pair of links 67 and 68 movable interconnect the extreme end of handle lever 60 with the fixed or stationary jaws 63. The punch or pliers just described is of conventional design and the actuating thereof is in accordance with conventional procedure. However, the present invention has been included in this embodiment by incorporating a die set having members 70 and 71 carried on the extreme end of handle lever 60 and the fixed jaw 64 respectively. The interconnection between the handle lever 60 and the die set member 70 is via a plunger 72 and a back up plate 73. Immediately ahead of the die set member 70, there is provided a clamping and squaring means taking the form of a clamp 74 having a thumb or wing screw 75 which will readily clamp the saw blade 15 thereto. A flat side or surface of the clamp means is used for squaring purposes as previously described with respect to the embodiment shown in FIG. 3. Lateral adjustment may be provided through the dove tail arrangement indicated in general by numeral 76 which is secured by a bolt 77.

Referring now in detail to FIG. 7, it can be seen that die set member 70 takes the form of a male die and that the die member 71 is a corresponding female member. The clamping and squaring means is immediately ahead of the jaws and it can further be seen that tremendous leverage is gained by depressing lever 60 with lever 61. In such an instance, the plunger 72 will lower causing the die set member 70 to come into contact with the selected end of the blade to be formed so that it presses against the female die set member 71.

With respect to FIG. 8, the clamping and squaring means is indicated wherein numeral 78 indicates a flat surface used for squaring purposes against which the smooth surface of the saw blade 15 is in abutment.

Referring now to FIGS. 9 and 10, still another embodiment of the present invention is shown wherein an adapter is illustrated in the general direction of arrow 80. The adapter is employed in instances where the coded or indexed end of the saw blade is substantially wider than the overall or general width of the saw blade 15. For example, saw blade 15 is illustrated in FIG. 9 with its original coded portion shown in broken lines and indicated by numeral 81. The special contour of the code or index includes an upwardly projecting member 82 with a depression 83. The line 84 indicates a severing of the saw blade during use which would normally make the remaining portion of the saw blade unusable. However, it is to be noticed that the projection 82, depression 83 and the general contour of the coded portion 81 is reproduced in the adapter 80 as indicated by numerals 82 prime and 83 prime. Therefore, the severed end of the blade 15 is merely attached to the adapter and the coded portion represented by member 82 prime and depression 83 prime become the coded portions which are then received into the chuck of the specific or given electric saw. Therefore, it can be seen the adapter 80 includes a plate 85 having the coded portion indicated by numeral 81 prime. The plate 85 includes an upper and lower ledge 86 and 87 between which the width of saw blade 15 is positioned. A back-up plate 88 is then placed against the opposite side of the blade and a thumb screw 89 is rotated so as to engage with a hole in the back-up plate 88, which draws the back-up plate against the saw blade to clamp it to the adapter.

In FIG. 10, it can be seen that the thickness of the saw blade 15 is clamped between the back-up plate 88 and the main body of the plate 85. Tightening is achieved by means of the thumb screw 89.

In view of the foregoing, it can be seen that a major savings in saw blades can be had by reusing those blades which have been broken or otherwise damaged so that the coded or indexed portion thereof will not fit a particular chuck. By using the press or punch of the present invention or the adapter, the severed or broken saw blades may be reused time and time again. The broken portion may be reused until the length of the blade will no longer be of use to the operator.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An apparatus for reproducing a coded portion of a saw blade in a severed or broken saw blade comprising the combination of:
    a support block;
    a movable plunger operably carried over said support block;
    a die set having one die member fixed on said support block and the other die member carried on said plunger;
    said die set members aligned with respect to each other so as to lie on a common axis;
    said die set members having opposing faces carrying a cutting die shaped in the form of the coded portion intended to be reproduced;
    a clamping and squaring means carried on said support block immediately ahead of said die set for receiving and holding the severed or broken saw blade so as to lie between said die set members;
    said plunger adapted to receive applied force urging said die set members together to form said saw blade;
    said apparatus is of a plier type having a pair of jaws; and
    said plunger operating through a selected one of said jaws effecting closure of said die set members together to form said saw blade.

2. The invention as defined in claim 1 wherein:
    said support block is carried on the other jaw of said pair; and
    handle means are operably coupled to said plunger and to said other jaw for urging said die set members together to form said saw blade.

3. The invention as defined in claim 2 wherein:
    means for insertably receiving and removing said die set members with respect to said support block.

4. The invention as defined in claim 3 wherein:
    said clamping means is a manually operated screw carried on a bracket immediately adjacent to said die set members.

5. The invention as defined in claim 4 wherein:
    said squaring means is a block having a flat surface adjacent said clamping means adapted to engage with said saw blade.

6. The invention as defined in claim 5 wherein:
    said die set includes a die configuration within the width of said saw blade.

* * * * *